Sept. 25, 1928.  
S. KAIL  
1,685,542

AUTOMATIC FEEDING MECHANISM FOR TAPPING MACHINES

Filed Jan. 21, 1925  6 Sheets-Sheet 1

Simon Kail  Inventor

By Lancaster and Allwine
his Attorneys

Sept. 25, 1928. 1,685,542
S. KAIL
AUTOMATIC FEEDING MECHANISM FOR TAPPING MACHINES
Filed Jan. 21, 1925 6 Sheets-Sheet 5

Simon Kail, Inventor

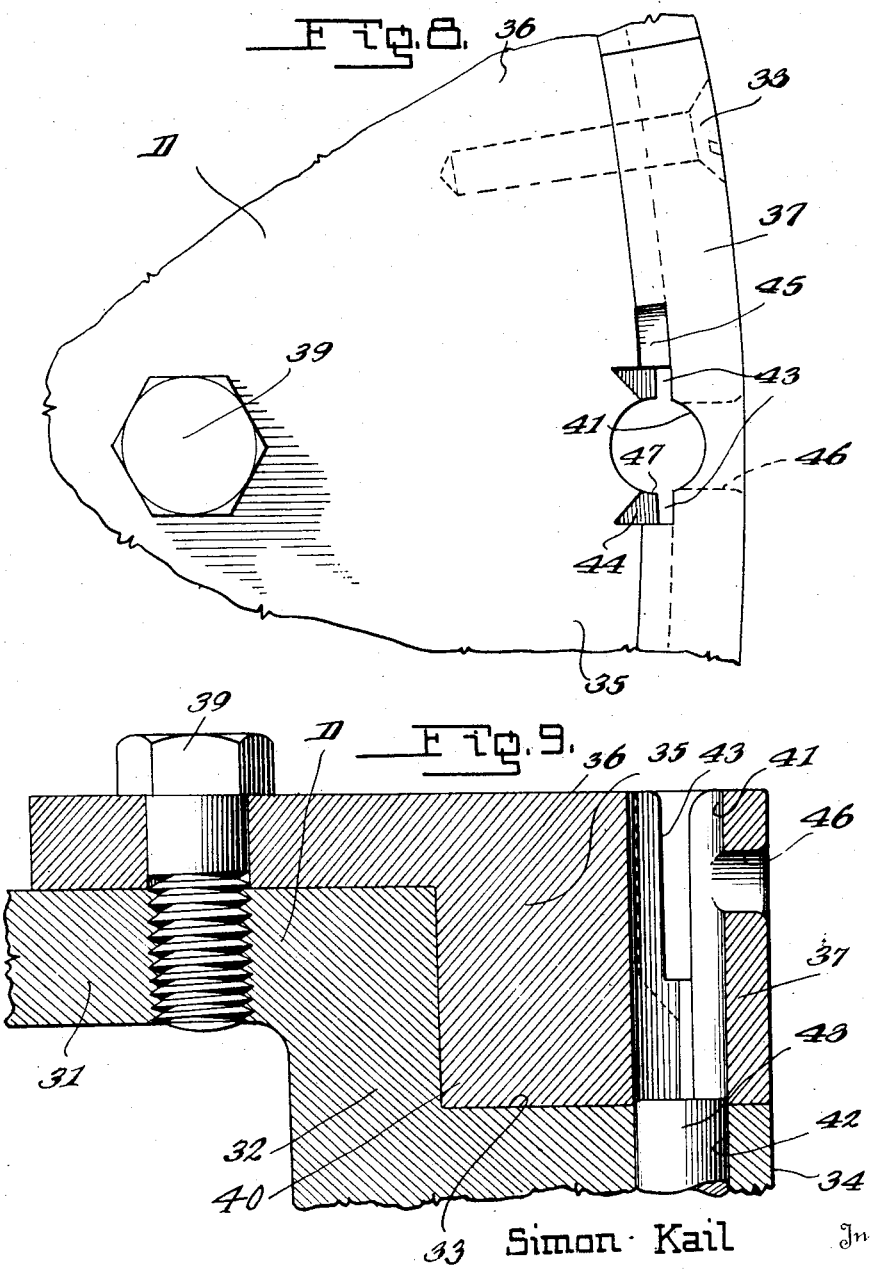

Patented Sept. 25, 1928.

1,685,542

UNITED STATES PATENT OFFICE.

SIMON KAIL, OF AKRON, OHIO.

AUTOMATIC FEEDING MECHANISM FOR TAPPING MACHINES.

Application filed January 21, 1925. Serial No. 3,856.

This invention relates to tapping machines, and the primary object of the invention is to provide an improved device for automatically and successively feeding the blanks or work to be internally threaded to the tapping tool, and an improved means for operatively connecting the device with the tapping tool and actuating means therefor, whereby the improved device and the tapping tool will be operated synchronously.

Another object of the invention is to provide an improved attachment for tapping machines, particularly of the type disclosed in Letters Patents #1,153,310, patented Sept. 14, 1915 and assigned to the Richert-Shafer Company of Erie, Pa., which embodies a table for receiving and holding the blanks or work, means for reciprocating the table for feeding the work to the tapping tool, means for rotating the table in a step by step motion, so as to bring the blanks successively in position, means operatively connecting said actuating means with the tapping machine, means for supplying the blanks or work to the table, and means for removing the blanks or work from the table after the same has been acted upon by the tapping tool.

Heretobefore, in the use of the tapping machine disclosed in the above mentioned Letters Patent, it has been necessary to feed the blanks by hand to the tapping tool, which has resulted in the necessity of employing an operator for each machine, and the spending of a large amount of time in the process of threading the nut or other work being acted upon. It is therefore a prime object of this invention to provide a machine, which will automatically feed the blanks successively to the tapping tool, so that the tapping of the blanks may be quickly and efficiently accomplished, and so that a single operator may attend to a number of the tapping machines.

A further object of the invention is to provide a novel type of block actuated from the tapping machine for reciprocating the table carrying the blanks for feeding the blanks to the tapping tool, the block being so constructed and arranged that a certain amount of resiliency will be had between the table and tapping tool, so as to insure the correct threading of the blanks.

A still further object of the invention is to provide an improved attachment for tapping machines of the above character, which will be durable and efficient in use, one that will be simple and easy to manufacture, and one which can be placed upon the market at a reasonable cost.

With these and other objects in view, the invention consists in the novel construction arrangement and formation of parts as will be hereinafter more specifically described, claimed and illustrated in the accompanying drawings forming a part of this specification, in which:

Figure 8 is a fragmentary top plan view of the work holding and receiving table, and Figure 9 is an enlarged fragmentary vertical section through the same.

Referring to the drawings in detail, wherein similar reference characters designate corresponding parts throughout the several views, the letter A indicates the automatic feeding mechanism for the blanks or work to be threaded; and B, the tapping machine.

Figure 1:
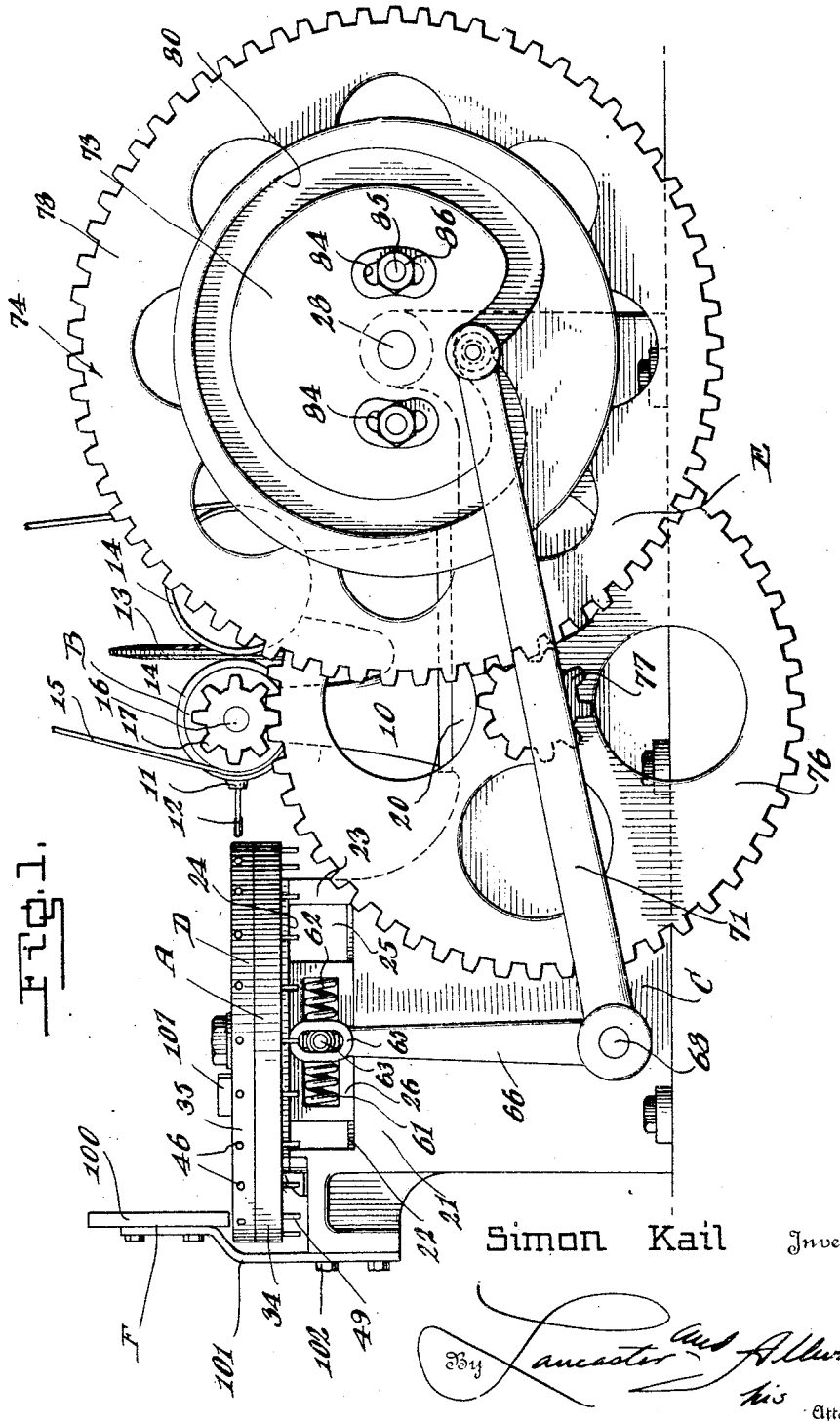
Figure 1 is a side elevation of the improved device, showing an ordinary tapping machine in connection therewith, and illustrating the means of connecting the attachment with the tapping machine.
Figure 2:
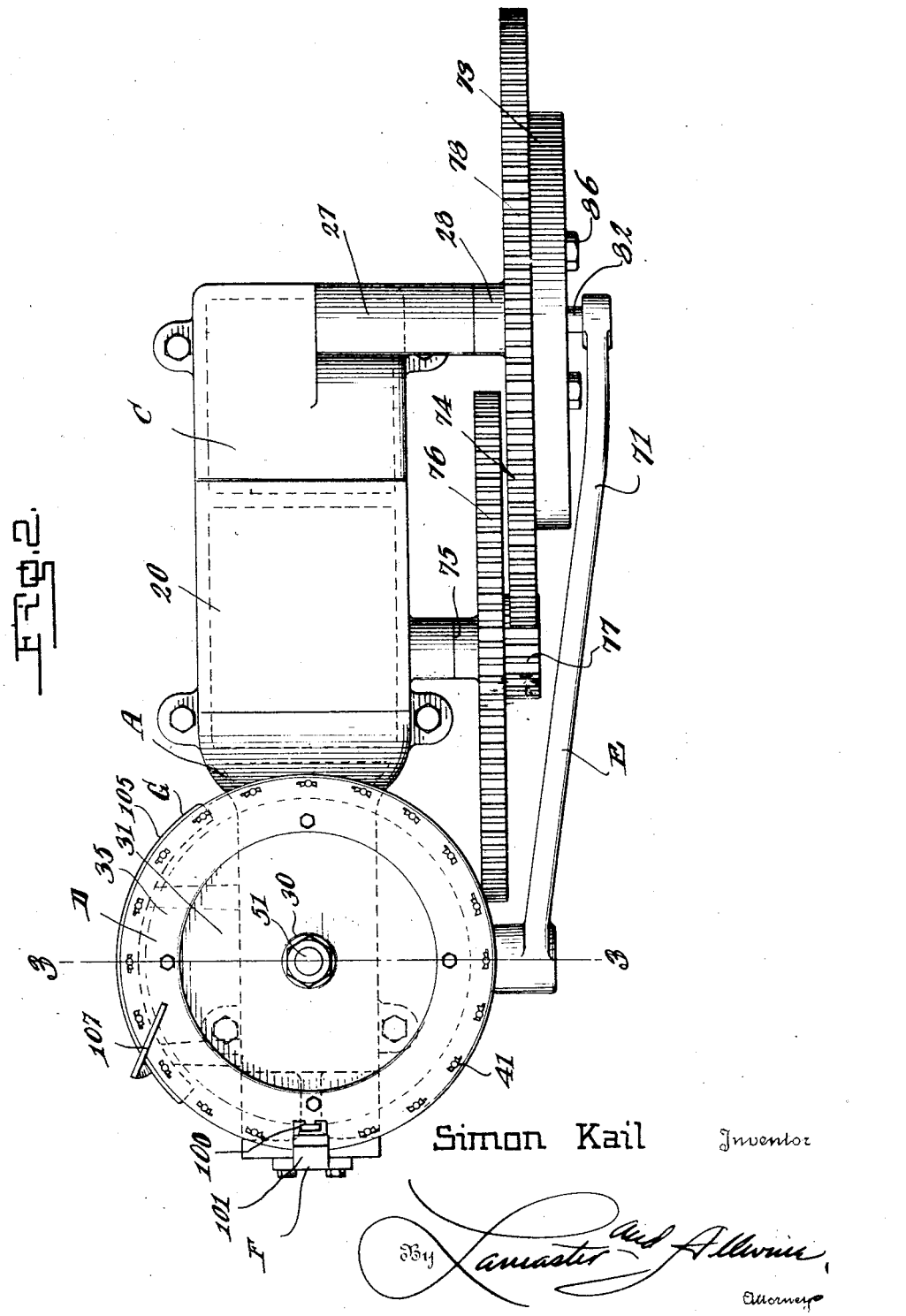
Figure 2 is a top plan view of the improved tapping machine attachment, the usual type of tapping machine being removed from the attachment.

The tapping machine B may be of the usual or any preferred make, and as stated, is preferably of the type disclosed in Letters Patent #1,153,310, and the feeding mechanism is operatively connected to the tapping machine, by means which will hereinafter be fully described. The tapping machine B includes a frame 10, which supports a horizontal longitudinally extending shaft 11, which carries removable taps 12. The tapping machine B embodies a mechanism for reversing the direction of rotation of the shaft and the tap 12 and this mechanism briefly described, includes a double faced friction wheel 13 which is keyed to the shaft 11 and a pair of spaced friction wheels 14 which are adapted to be engaged by the double faced friction wheel 13. These friction wheels 14 are driven by means of a belt or the like 15 and are supported by transversely extending shafts 16 one of which has keyed or otherwise secured thereto a drive pinion 17, which constitutes the means for connecting the tapping machine with the feeding mechanism A.

The improved automatic feeding mechanism A includes the base C; the blank or work receiving table D; the operating means E for the table; the means F for feeding the work to the table; and the means G for removing the work from the table after being acted upon by the tapping tool.

The base C is formed in any preferred manner and of any preferred material and includes a centrally disposed bed plate 20 on which is bolted or otherwise secured the frame 10 of the tapping machine B. The base C forwardly of the plate 20 is provided with the upwardly extending head 21 which is reduced in width and which has secured thereto in any preferred manner the longitudinally extending centrally disposed guide rib 22, the purpose of which will also be hereinafter more fully described. As shown this guide rib 22 is held in position by means of a suitable screw 23'. The upper surface of the head 21 adjacent to its opposite ends is provided with a pair of upstanding lugs 23 which have secured to the upper surface thereof the flat plate 24 which is of substantially the same width and general configuration as the head 21. This plate 24 and the head 21 with the lugs 23 defines a guide way 25, in which is reciprocably mounted the actuating block 26 for the blank or work receiving table D and which forms a part of the operating means E for the table. The base C rearwardly of the bed plate 20 is provided with a transversely extending bearing 27 which rotatably receives the shaft 28 which also forms a part of the operating means E for the table which will be hereinafter more specifically described.

The blank or work receiving table D is mounted for rotary movement as well as reciprocatory movement on the head 21, so as to permit the work to be successively brought into alignment with the tap 12 and to feed the work into engagement with the tap.

The table D is of circular configuration and includes the hub 30 and the disc shaped body 31. The periphery of the disc shaped body 31 is provided with a depending annular flange 32, the outwardly extending seat 33 and the depending flange 34. The seat 33 is adapted to receive the rim 35, which forms the means for receiving and holding the blanks or work to be acted upon by the tapping tool 12. This rim 35 is freely removable from the table so that different types of rims may be associated with the table for different types of work, and these rims preferably include an annular body 36 and a retaining ring 37, which may be formed of arcuate sections. When the ring 37 is used as part of the rim 35, suitable retaining bolts or machine screws 38 are utilized for holding the same in position. The annular body 36 is adapted to rest upon the upper surface of the disc shaped body 31 of the table D and is removably held in position thereon by suitable fastening elements, such as machine screws 39. The outer edge of the body is provided with a depending enlargement 40 which is adapted to fit directly upon the seat 33. The depending enlarged portion 40 of the rim in connection with the ring 37 constitutes the portion for receiving and holding the blanks or work to be acted upon, and a plurality of equi-distantly spaced apertures 41 are formed therein for receiving the work. These apertures 41 register with similar apertures 42 formed in the ledge or flange 34. The apertures 41 adjacent to their upper ends are shown provided with the lateral extensions 43 and the inner walls of these lateral extensions may be bevelled as at 44. One side wall or one lateral extension 43 may be provided with an inclined guide way 45 which serves as means for guiding the blanks or the work into the recesses 41. Each of the recesses 41 have communicating therewith the radially extending aperture 46, through which the tapping tool 12 is adapted to pass when acting upon the work. It can be seen that as the work falls into the apertures 41, the opposite sides or margins thereof will be received in the lateral extensions 43, to hold the work spaced from the wall 47 of each opening or recess 41, to prevent scraps and material cut by the tapping tool from going between the work and the walls of the opening. This also provides means for permitting the tool to ride past the work without acting upon the table. It is to be understood, of course, that the specific construction and formation of the apertures 41 and extensions 43 can be varied in accordance with the character of the work to be threaded. The lower ends of the apertures 42 are reduced in diameter as at 48 for receiving the shanks 49 of the plungers 50 which form a portion of the work or blank removing mechanism G, which will also be hereinafter more fully described. The hub portion 30 of the work receiving and holding table D receives the centrally disposed shaft 51, which is rotatably mounted in the bearing sleeve 52, which is threaded or otherwise connected to the block 26. Intermediate the plate 24 and the table D is a ratchet wheel 53, and the ratchet wheel 53 and the table D are secured to the shaft 51 by means of a common key 54. The ratchet wheel 53 forms part of the operating means for the table, which as stated, will be hereinafter more fully described. The bearing sleeve 52 has formed thereon an annular flange 55, which is adapted to fit in the guide slot 56, which extends longitudinally of the plate 24, and forms means for holding the shaft 51 against lateral movement during the actuation of the slide block 26.

The operating means E for the table D includes the slide block 26 which, as stated, is mounted for reciprocatory movement in the guide way 25 defined by the head 21, the lugs 23 and the plate 24. Lateral shifting movement of the slide block 26 in the guide way 25 is not only prevented by the annular shoulder 55 formed on the bearing sleeve 52, but also by the guide rib 22, and the lower surface of the slide block 26 is provided with a longitudinally extending guide groove 58 for the reception of the same. The slide block 26 is of substantially rectangular formation and is provided with a transversely extending slot or guide way 59, in which is mounted, for longitudinal movement of the block, the transversely extending slide head 60.

The slide head 60 extends beyond the side faces of the slide block 26 and engages the upper and lower walls of the slot 59 and is held centered in the slot by means of relatively heavy expansion coil springs 61 and 62. The outer ends of the slide heads are provided with outstanding pintles 63 which have mounted thereon suitable bearing sleeves 64 which are received in slots 65 formed in the rocker arms 66 which are arranged at the opposite sides of the base C. The lower ends of the rocker arms 66 are provided with hub portions 67 which receive the transversely extending rocker shaft 68 which is mounted in suitable bearings 69 carried by the base C below the head 21 thereof. The hub portions 67 of the rocker arms 66 may be secured in any preferred manner to the rocker shaft and, as shown, pins 70 are used. One end of the rocker shaft 68 has secured thereto in any preferred manner the forward end of an operating lever 71. As shown, the operating lever is connected to the rocker shaft 68 by means of a diametrically extending pin 72. The operating lever 71 is connected to a cam wheel 73, which is in turn connected with the drive pinion 17 secured to the tapping machine B by speed reducing mechanism 74 which will now be described.

The base C supports a transversely extending shaft 75 which is positioned directly below the bed plate 20 and preferably in alignment with the drive pinion 17. This shaft has keyed or otherwise secured thereto a relatively large spur gear wheel 76, which meshes with the drive pinion 17, and the shaft 75 also has secured thereto a relatively small pinion 77 which in turn meshes with a relatively large spur gear wheel 78, which is mounted upon the shaft 28 that is mounted in the bearing 27 carried by the rear end of the base C. The cam wheel 73 is connected to the outer face of the relatively large drive spur gear wheel 78 and is provided with an axial opening for the reception of the shaft 28 so that the cam wheel 73 will be centered in relation to the spur gear 78. The wheel 73 is provided with a heart shaped cam slot 80, in which is adapted to ride the roller 81, which is mounted upon the wrist pin 82 which is, in turn, carried by the inner end of the operating lever 71. This pin 82 may be provided with a suitable oil duct 83 so that the pin and roller will be effectively lubricated. In order to permit of a slight adjustment between the wheel 73 and the spur gear wheel 78, the cam wheel 73 is provided with a pair of arcuate slots 84 which are arranged in concentric relation with the axial opening in the wheel for receiving the shaft 28. These arcuate slots 84 are adapted to receive suitable bolts 85 carried by the spur gear wheel 78 and the bolts 85 receive retaining nuts or the like 86.

It can be seen that when the tapping machine B is in operation, the wheel 73 will be rotated through the speed reducing mechanism 74, which in turn will actuate or rock the operating lever 71 through its cam slot 80, and this lever in turn will oscillate the rocker shaft 68 which will rock the arms 66. These arms in turn will reciprocate the block 26 and thus move the table toward and away from the tapping tool 12.

In order to permit the table D to be rotated step by step so as to successively bring the work carrying apertures 41 in front of the tapping tool 12 and the opening 46 in direct alignment with the tapping tool, the ratchet and pawl mechanism 87 is provided. The ratchet wheel 53 forms a part of this mechanism and is adapted to be engaged by a pivoted pawl 88 which is connected to the outer end of a rod 89, which is carried by a suitable supporting sleeve 90 which is formed or otherwise secured to the plate 24. The rod is adjustably mounted in the sleeve and is held in any preferred adjusted position therein by means of suitable collars 91 which are adapted to engage the opposite ends of the sleeve 90. These collars are held against accidental sliding movement on the rod 89 by means of set screws 92. The pawl 88 is normally urged into engagement with the ratchet wheel 53 by means of a spring 93.

It can be seen that when the table is moved forwardly toward the tapping tool 12, the pawl 88 will ride over the ratchet teeth on the ratchet wheel 53, but when the table is returned to its normal position the pawl will catch in one of the teeth of the wheel and partially rotate the table so as to bring the next blank into alignment with the tapping tool.

In order to prevent the accidental actuation of the table D while the blank is being acted upon by the tapping tool, a bolt 94 is provided for engaging the ratchet wheel. This bolt 94 is slidably mounted in a suitable guide sleeve 95 carried by the central portion of the plate 24 and is normally urged into engagement with the ratchet wheel by means of contractile coil springs 96. These springs 96 are arranged on opposite sides of the bolt 94 and are secured to the outer end thereof and to suitable screws 97 or the like attached to the plate 24.

The blank or work receiving mechanism F constitutes a chute 100 which is arranged in a vertical plane and is disposed directly above the work holding and receiving table D. The chute 100 is of substantially a U-shaped configuration in cross section and is held in place by means of an attaching bracket 101, which is bolted or otherwise secured by member 102 to the forward end of the head 21. The blanks or work to be acted upon by the tapping tool 12 are fed into the chute 100 by hand or the chute may lead from a suitable hopper (not shown).

It can be seen that when the table D is moved forwardly to feed the blanks or work into the tapping tool, one of the work receiving openings 41 will be moved into direct alignment with the chute 100 which will permit one of the blanks to drop into the said opening. As the table is rotated by step by step movement, one of the work receiving apertures 41 is moved into alignment with the chute, while the opening diametrically opposite is moved into alignment with the tapping tool.

The means G for removing the work from the table D after the same has been acted upon by the tapping tool 12 includes the plungers 50 as heretobefore stated, and it can be seen that the shank portions 49 thereof protrude beyond the lower surface of the table. These protruding portions of the plungers are adapted to ride up the inclined way or cam track 105 which is of arcuate formation. This inclined way or cam track 105 is arranged in concentric relation with the table D and as the table D is rotated, step by step, the plungers will gradually ride up the inclined way or cam track 105 and thus push the work or blanks out of the opening 41. This track or inclined way 105 is carried by suitable brackets 106, which may be secured to the slide block 26.

In operation of the improved device, the blanks are fed to the chute 100 and the table is rotated until one blank is positioned in front of the tap 12. The device is then ready for operation. When power is applied to the tapping machine, the friction wheels 14 will be rotated, and the wheel 73 will be rotated at a reduced rate of speed through the speed reducing mechanism 74. The rotation of the wheel 73 will operate the rocker arms 66 as heretobefore stated, and move the table D forward, and the blank in alignment with the tool in engagement therewith. This will move the friction wheel 13 slightly rearwardly and into engagement with one of the frictional drive wheels 14, which will rotate the tapping tool 12 in a clockwise direction, and thread the blank. The device is so gauged that when the blank is threaded the roller 81 will be in such a position in the cam slot 80 that the block 26 will be moved rearwardly, which will also move the table D rearwardly. This will slide the friction wheel 13 into engagement with the forward friction drive wheel 14 and reverse the direction of rotation of the tap 12 and thus rotate the same out of the tap just threaded. As the table is moved rearwardly, the same will be rotated by means of the pawl and ratchet mechanism 87, which will move the table one step which will bring the next blank or article to be acted upon in alignment with the tapping tool 12. As the table is moved forwardly, the chute 100 will be moved into alignment with the opening, diametrically opposite the opening 41 which is in alignment with the tap, and another blank will be placed therein. The laterally extending ways 43 and the inclined walls 44 thereof, and the enlarged central portions of the openings 41 form a positive means for permitting the shavings to fall from the table and thus permit the table to be kept in a clean condition. After the blanks have been threaded and moved to the upper surface of the table by means of the plungers 50, which have heretobefore been described, the same engage a stationary sweeping blade 107, which brushes the blanks off of the table and into a suitable receptacle (not shown) arranged at one side of the table.

Figure 3:
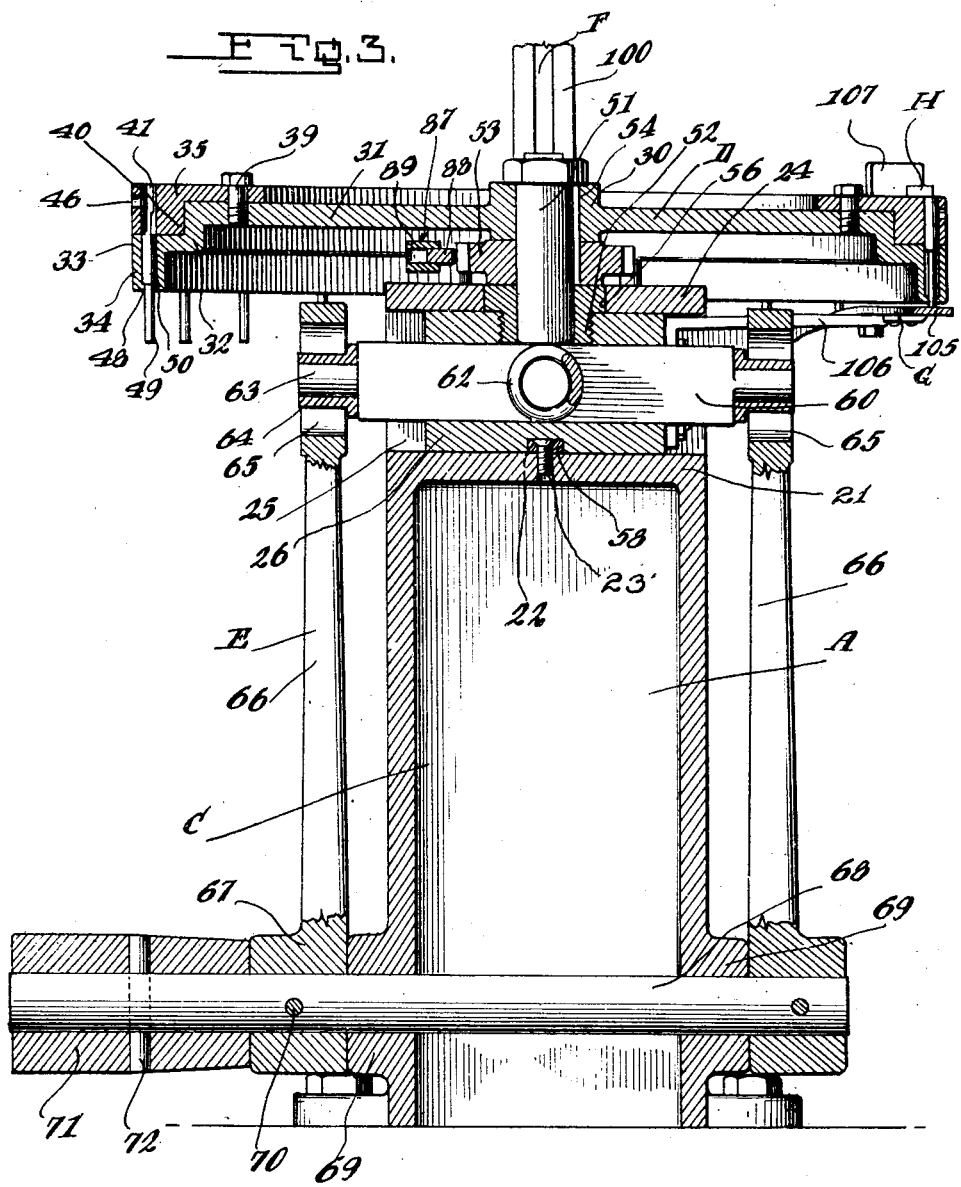
Figure 3 is a vertical transverse section through the attachment taken on the line 3—3 of Figure 2.
Figure 4:
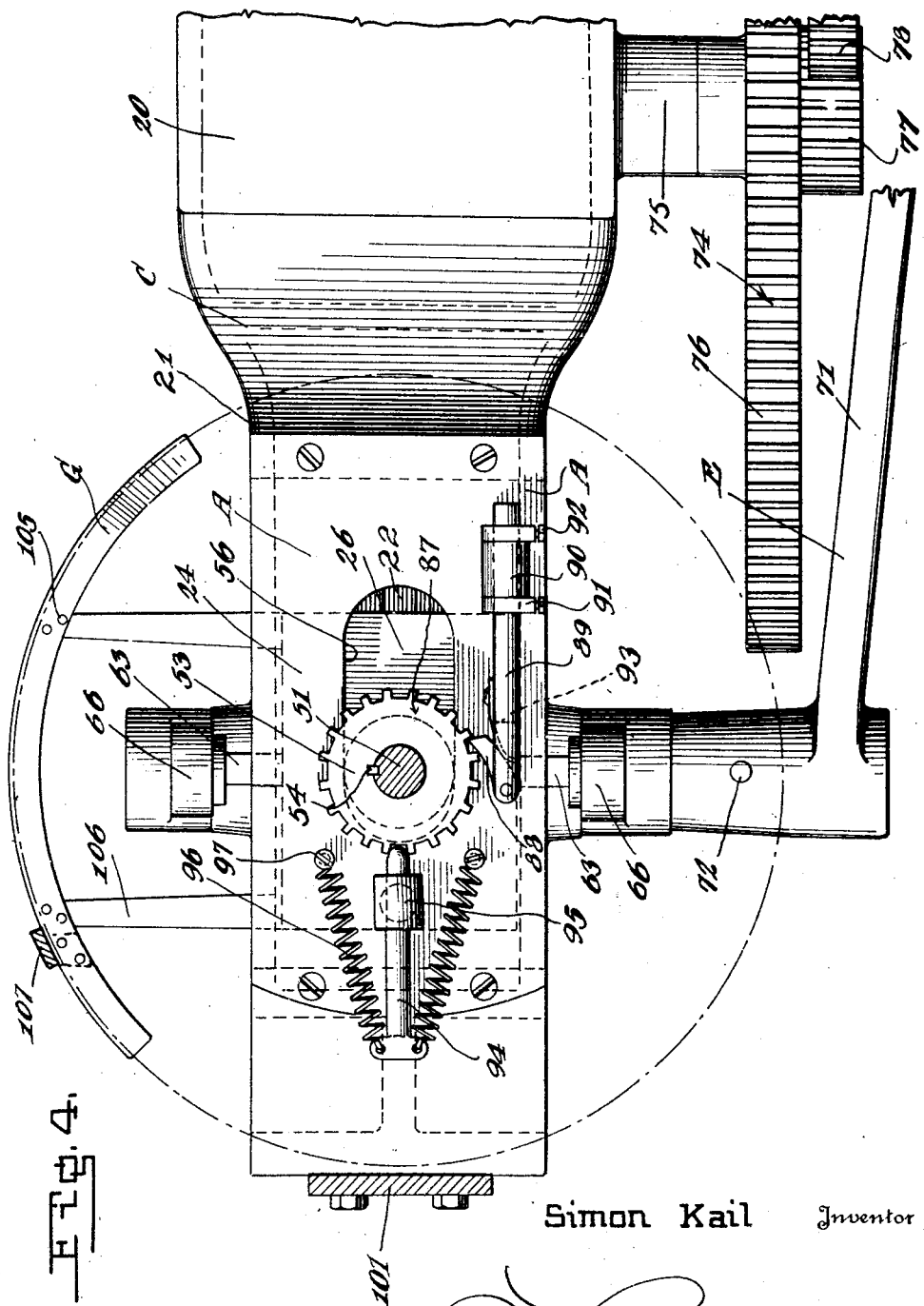
Figure 4 is an enlarged fragmentary plan view of the improved attachment, the table portion being removed for illustrating the operating parts positioned thereunder, the shaft for supporting the table being shown in section, and the bracket for supporting the feed chute for the blanks being shown in section.
Figure 5:
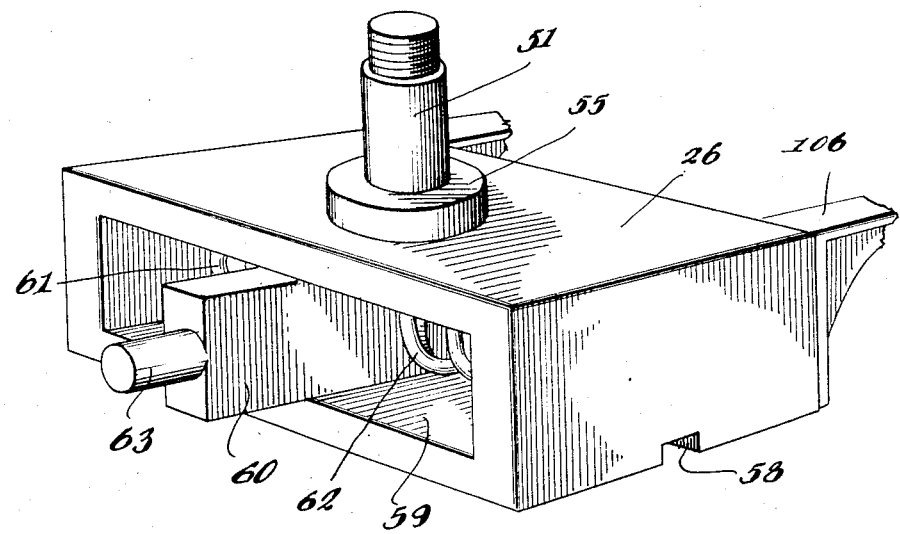
Figure 5 is a detail perspective view of the block for supporting the table, and the operating head arranged in said block.
Figure 7:
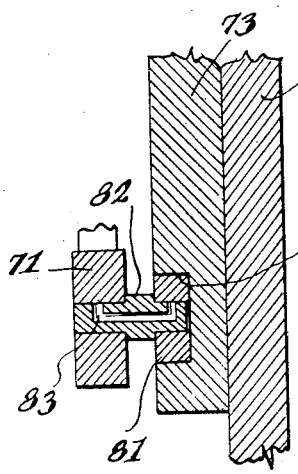
Figure 7 is an enlarged fragmentary section through the cam wheel and operating rod head illustrating the means of associating the roller carried by the operating rod head with the cam wheel.
Figure 6:
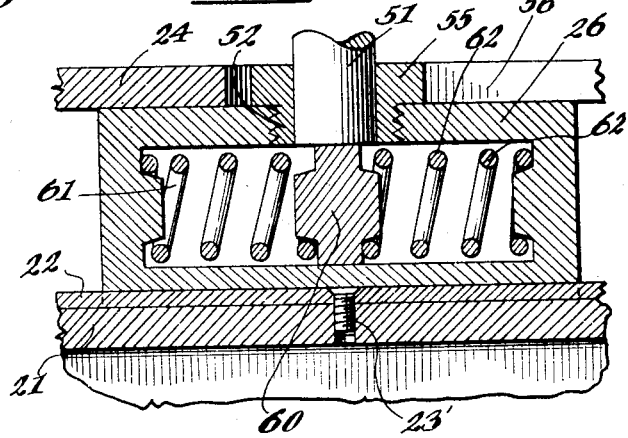
Figure 6 is an enlarged fragmentary vertical transverse section through the block and associate parts illustrating the means for slidably connecting the blocks to the frame of the attachment.

In the drawings, the work, which is designated by the letter H has been shown by way of example to be nuts or the like, and it is to be understood that the machine can be utilized for threading other articles. When the nut blanks are dropped from the chute 100 into the openings 41, they are so arranged that the bores thereof will lie with their axes horizontal in direct registration with the radially extending openings 46 which communicate with the work receiving openings 41. When the plungers 50 force the same upwardly out of the work receiving openings the same will fall to one side, as shown in Figure 3 of the drawings.

The means for resiliently mounting the slide head 60 in the slide block 26 forms an effective means for cushioning the table during its reciprocatory movement, so as not to form a positive means for feeding the blanks into engagement with the tapping tool, thus insuring the correct threading of the blanks.

Changes in details may be made without departing from the spirit or scope of this invention; but,

I claim:

1. The combination with a tapping machine, of a device for feeding articles to be threaded to said tapping machine including a rotary and reciprocatory table, speed reducing mechanism operatively connecting said table with said tapping machine to permit synchronous operation thereof, a plurality of article receiving seats formed in said table, means for feeding the articles to said seats, and automatic means for removing the articles from said seats after being acted upon by said tapping machine.

2. The combination with a tapping machine, of a device for automatically feeding articles to be threaded to said tapping machine including a rotary and reciprocatory table having a plurality of article receiving seats formed therein, a wheel having a cam slot formed therein, speed reducing mechanism operatively connecting said wheel with said tapping machine, a slide block for supporting said table, an operating lever, a roller carried by said operating lever and arranged in said cam slot, a rocker shaft secured to said lever, rocker arms secured to said shaft and operatively connected to said slide block, and means for feeding the articles to be threaded to said seats.

3. The combination with a tapping machine, of means for feeding articles to be threaded to said tapping machine including a table having a plurality of work receiving seats formed therein, a wheel having a cam slot formed in one face thereof, speed reducing mechanism operatively connecting said wheel with said tapping machine, a rocker shaft, a lever secured to said rocker shaft, a roller carried by said lever and arranged in said cam slot, a slide block supporting said table, rocker arms secured to said shaft and operatively connected to said table, a ratchet wheel carried by the table, and a dog mechanism for engaging said ratchet wheel to rotate the table in a step by step movement during reciprocation thereof by said rocker arms.

4. The combination with a tapping machine, of a device for feeding articles to be threaded to said tapping machine including a base having a bed plate for receiving the tapping machine, a head formed on the base and arranged forwardly of the tapping machine a slide block mounted for reciprocatory movement on said head, a rotatable stub shaft carried by said block, a table keyed to said stub shaft, a ratchet wheel keyed to said stub shaft, a cam wheel, a speed reducing mechanism operatively connecting the cam wheel with the tapping machine, a rocker shaft, an operating lever secured to said rocker shaft and operatively connected to said cam wheel, rocker arms secured to said shaft and operatively connected to said slide block for reciprocating said table, a stationary dog mechanism arranged to engage said ratchet wheel to impart a rotary movement to said table during the reciprocation thereof by said slide block, and a locking means for holding the table against accidental rotation during the tool acting period upon the work carried by the table.

5. In a machine for feeding articles to be threaded to a tapping machine, a base having a bed plate arranged to receive the tapping machine, a head carried by the base and arranged forwardly of the tapping machine having a guide way arranged longitudinally therein, a slide block reciprocably mounted in said guide way, a rotatable stub shaft carried by said slide block, a table having a plurality of work receiving seats formed therein keyed to said stub shaft, a ratchet wheel keyed to said stub shaft, a transversely extending shaft carried by the base arranged rearwardly of said tapping machine, a relatively large spur gear wheel carried by said shaft, a cam wheel adjustably mounted upon said spur gear wheel, a second transversely extending shaft carried by the base, a relatively large spur gear wheel keyed to said shaft and meshing with the drive pinion, a relatively small spur gear wheel secured to said second mentioned shaft and engaging the first mentioned relatively large spur gear wheel, a rocker shaft, an operating lever keyed to said rocker shaft, a roller carried by the outer end of said operating lever arranged to operatively engage said cam wheel, rocker arms keyed to the rocker shaft and operatively connected to said slide block, and a guide mechanism arranged to engage said ratchet wheel, whereby the table will be rotated in a step by step movement during reciprocation thereof.

6. In a machine for feeding articles to be threaded to a tapping machine, a slide block having a horizontally disposed longitudinally extending slot, a work receiving table carried by the block, a cross head arranged centrally within the slot in said block, expansion springs engaging said cross head and normally holding the same at the transverse center of the slot, trunnions formed on the opposite ends of the cross head and rocker arms for engaging said trunnions.

7. In a machine for feeding articles to be threaded to a tapping machine, a base having a head, a longitudinally extending guide way formed on the head including a pair of upstanding lugs, a guide plate secured to the lugs having a longitudinally extending slot formed therein, a longitudinally extending guide rib arranged in said guide way and in alignment with said slot, a slide block reciprocably mounted in said slide block having a longitudinally extending way having a longitudinally extending groove arranged to receive said guide rib, an upstanding rotatable stub shaft carried by said block and arranged in the slot formed in the guide plate, a circular table keyed to said stub shaft, a ratchet wheel keyed to said stub shaft, a pivoted dog arranged to engage the ratchet wheel, and means for reciprocating said slide block.

8. In a machine for feeding articles to be threaded to a tapping machine, a slide block, an upstanding rotatable stub shaft carried by the slide block, means for reciprocating the slide block, a circular work receiving table keyed to said stub shaft, a ratchet wheel keyed to said stub shaft, an adjustable rod arranged below the table, a spring pressed pivoted dog carried by said rod arranged to engage said ratchet wheel, and a spring pressed bolt arranged to engage said ratchet wheel to prevent accidental operation thereof.

9. In a machine for feeding articles to be threaded to a tapping machine, a circular table having a plurality of vertically disposed work receiving openings formed therein extending entirely through the same arranged in annular formation, said table having a plurality of radially extending tool receiving openings formed therein communicating with said work receiving openings, the openings having laterally extending ways communicating therewith, the inner walls of said ways being bevelled, and inclined work receiving ways communicating with certain of said laterally extending ways.

10. In a machine for feeding articles to be threaded to a tapping machine, a table including a hub, a disc shaped body having an annular seat formed on the periphery thereof, a detachable rim removably fitted on said seat, a removable retaining ring carried by said rim, the seat, rim and ring having work receiving openings formed therein, and plungers reciprocably carried by said seats arranged to move in the work receiving openings formed in the seat rim and ring.

SIMON KAIL.